3,114,689
CERAMIC FUEL FOR NUCLEAR REACTORS
Lawrence H. Cope, Thurso, Caithness, Scotland, assignor to United Kingdom Atomic Energy Authority, London, England
No Drawing. Filed June 27, 1960, Ser. No. 38,695
Claims priority, application Great Britain June 26, 1959
2 Claims. (Cl. 204—154.2)

This invention relates to ceramic fuel for nuclear reactors.

Ceramic nuclear fuel is usually formed into fuel bodies of convenient shape and size by mixing particles of ceramic nuclear fuel (with or without a diluent) with an organic binder, pressing the mixture to form a green compact and sintering the compact. On sintering, the organic binder decomposes and may leave a deposit of free carbon which is an impurity which can only be tolerated in extremely small quantities (i.e., parts per million). It has, therefore, been the practice to insert a binder removal step prior to sintering but even if the step is very carefully controlled it is almost impossible to ensure complete binder removal.

According to the present invention a method of making a ceramic nuclear fuel body includes the steps of mixing particles of the ceramic with a binder comprising gelatinous fissionable material, pressing the mixture to form a green compact and sintering the compact.

A binder comprising gelatinous fissionable material serves additionally as a means of incorporating fissionable material in a diluent matrix at a relatively late stage in manufacture so that handling of fissionable material which is radioactive is reduced. Further, being gelatinous, the binder also acts as a plasticizer and will assist uniform density distribution in the green compact.

A preferred binder is the substance known as colloidal plutonium (IV) or plutonium (IV) polymer which is believed to be the quadrivalent hydroxide or hydrated oxide. It is formed by diluting acid quadrivalent plutonium solutions with water or aqueous ammonia. Separation from ionic plutonium species may then be effected by anion exchange using, for example Amberlite, R-120 (registered trademark) in the hydrogen form (see J. Chem. Soc., 1956, p. 3358). Decomposition of this binder during the sintering step serves to form activated plutonium dioxide ($PuO_2$) that is, plutonium dioxide produced in situ and having an increased surface energy compared with plutonium dioxide prepared separately and added as oxide to the diluent matrix afterwards. This increased energy is due to the chemical decomposition of the binder bringing about disordering of the surface and rendering it more unstable by the multiplication of lattice defects. The imparted activity will assist sinter bond formation.

It is considered that with uranium dioxide powder as the ceramic forming the basis of the nuclear fuel body ½% to 2% by weight of gelatinous plutonium polymer is sufficient to bind the powder. The following is an example of a preferred way of carrying the invention into effect.

Example

Natural uranium dioxide powder was loaded into a rubber-lined ball mill containing steel balls twice the weight of the uranium dioxide powder and 2% by weight of gelatinous plutonium polymer was added. The mixture was then subjected to ball milling for five hours to both homogenize and densify the mixture. The steel balls were removed from the mill and the densified mixture granulated by tumbling in the mill for a further thirty minutes. The mixture was then sieved and the fraction passing a No. 10 British Standard sieve and retained by a No. 60 British Standard sieve was collected for pressing. Pressing into cylindrical green compacts of the required size was then effected in an automatic double acting press using a 0.375" diameter die with a punch clearance between 0.002" and 0.003" and the green compacts were sintered in argon at 1450° C. in a high frequency induction furnace using graphite susceptors as the heating medium.

The nuclear fuel bodies produced were suitable for insertion in a protective sheath to form a nuclear reactor fuel element.

Because of the improved sintering characteristics of the green compacts produced by the method of the invention it is not necessary to use non-stoichiometric uranium dioxide in order to produce a dense nuclear fuel body. Stoichiometric uranium dioxide (which withstands irradiation damage better than the non-stoichiometric oxide) may be used.

I claim:
1. A method of making a ceramic nuclear fuel body comprising the steps of mixing particles of the ceramic with a binder consisting essentially of a gelatinous compound of quadrivalent plutonium selected from the group consisting of the hydroxide and hydrated oxides, pressing the mixture to form a green compact and sintering the compact at a temperature to convert the gelatinous compound of quadrivalent plutonium to plutonium dioxide.

2. A method of making a ceramic nuclear fuel body comprising the steps of ball-milling a mixture of uranium dioxide powder and between ½ percent and 2 percent by weight of a binder consisting essentially of a gelatinous compound of quadrivalent plutonium selected from the group consisting of the hydroxide and hydrated oxides, granulating the mixture by tumbling, pressing the granulated mixture to form a green compact of the required shape and size, and sintering the compact to convert the gelatinous compound of quadrivalent plutonium to plutonium dioxide.

References Cited in the file of this patent
UNITED STATES PATENTS
2,397,831    Bellamy _____ Apr. 2, 1946

OTHER REFERENCES
AEC Document TID-7546, Bk. 2, November 18, 1957, pp. 526–548.
AEC Document HW-60276, April 27, 1959.